(12) United States Patent
Morper et al.

(10) Patent No.: US 9,435,485 B2
(45) Date of Patent: Sep. 6, 2016

(54) METHOD FOR DISPENSING A LUBRICANT IN A METERED MANNER

(71) Applicant: PERMA-TEC GMBH & CO. KG, Euerdorf (DE)

(72) Inventors: Rainer Morper, Ramsthal (DE); Jochen Lehnert, Niederlauer (DE)

(73) Assignee: PERMA-TEC GMBH&CO.KG, Euerdorf (DE)

( * ) Notice: Subject to any disclaimer, the term of this patent is extended or adjusted under 35 U.S.C. 154(b) by 0 days.

(21) Appl. No.: 14/378,589

(22) PCT Filed: Oct. 25, 2013

(86) PCT No.: PCT/EP2013/072438
§ 371 (c)(1),
(2) Date: Aug. 13, 2014

(87) PCT Pub. No.: WO2014/079655
PCT Pub. Date: May 30, 2014

(65) Prior Publication Data
US 2015/0041488 A1   Feb. 12, 2015

(30) Foreign Application Priority Data
Nov. 21, 2012   (DE) .................. 10 2012 111 239

(51) Int. Cl.
*F16N 27/00* (2006.01)
*F16N 11/10* (2006.01)

(52) U.S. Cl.
CPC ............. *F16N 27/00* (2013.01); *F16N 11/10* (2013.01); *F16N 2230/02* (2013.01); *F16N 2250/08* (2013.01); *F16N 2250/50* (2013.01); *F16N 2270/20* (2013.01)

(58) Field of Classification Search
CPC ...................................................... F16N 27/00
USPC ............................................................ 184/7.4
See application file for complete search history.

(56) References Cited

U.S. PATENT DOCUMENTS 4,671,386 A * 6/1987 Orlitzky ................ F16N 11/10
184/39
5,788,012 A * 8/1998 Yang .................... F16N 11/10
184/39

(Continued)

FOREIGN PATENT DOCUMENTS

DE   102007033539 A   1/2009

*Primary Examiner* — William E Dondero
*Assistant Examiner* — Mark K Buse
(74) *Attorney, Agent, or Firm* — Andrew Wilford

(57) ABSTRACT

The invention relates to a method for dispensing a lubricant (3) in a metered manner by means of a lubricant dispenser, which comprises a lubricant cartridge (2) filled with lubricant (3), at least one electrochemical gas-generating cell (4), and on control electronics (1) for controlling the gas-generating cell (4). The control electronics (1) comprise a microcontroller (8) and a switch (9) for interrupting the current flowing through the gas-generating cell (4). At adjustable time intervals, the circuit through the gas-generating cell (4) is closed by the control electronics (1) and lubricant (3) is displaced from the cartridge (2) by the released gas. During the gas generation, the electric current flowing through the gas-generating cell (4) is measured and the charge that has flowed through the gas-generating cell (4) is added up. The circuit is interrupted when the added-up charge has exceeded a specified cumulative amount of charge.

9 Claims, 1 Drawing Sheet

(56) References Cited

U.S. PATENT DOCUMENTS

| | | | | |
|---|---|---|---|---|
| 5,992,700 A * | 11/1999 | McGlothlin | ........ | A61M 5/1486 222/187 |
| 6,408,985 B1 * | 6/2002 | Orlitzky | .................. | F16N 11/08 184/105.2 |
| 6,561,316 B1 * | 5/2003 | Fenn | .................... | F16C 33/6625 184/105.1 |
| 8,607,933 B2 * | 12/2013 | Eisenbacher | ........... | F16N 11/10 184/29 |
| 8,783,418 B2 * | 7/2014 | Orlitzky | .................. | F16N 13/14 184/37 |
| 8,978,828 B2 | 3/2015 | Eisenbacher | | |
| 2006/0180395 A1 * | 8/2006 | Graf | ........................ | F16N 11/08 184/26 |
| 2008/0060879 A1 * | 3/2008 | Orlitzky | .................. | F16N 11/10 184/39 |
| 2008/0271950 A1 * | 11/2008 | Eisenbacher | ........... | F16N 11/10 184/7.4 |
| 2009/0133962 A1 * | 5/2009 | Orlitzky | .................. | F16N 13/14 184/37 |
| 2011/0296902 A1 * | 12/2011 | Eisenbacher | ........... | F16N 11/10 73/53.05 |
| 2011/0315485 A1 * | 12/2011 | Morper | .................. | F16N 11/10 184/39 |

* cited by examiner

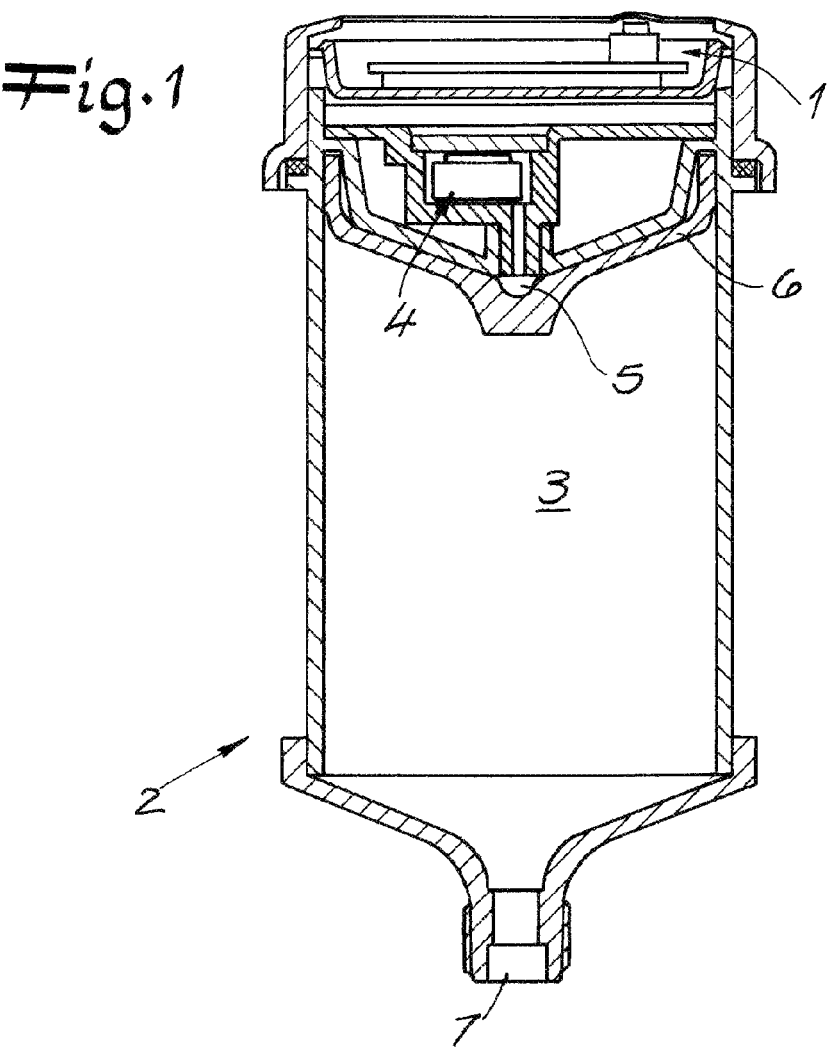
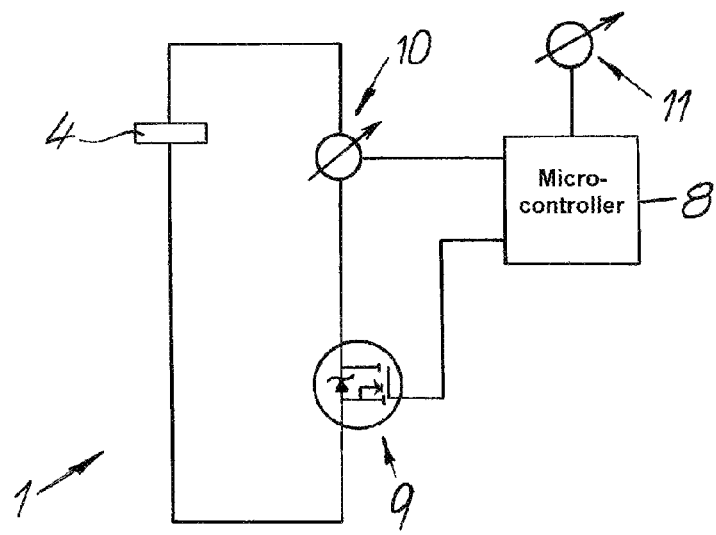

METHOD FOR DISPENSING A LUBRICANT IN A METERED MANNER

CROSS REFERENCE TO RELATED APPLICATIONS

This application is the US-national stage of PCT application PCT/EP2013/072438 filed 25 Oct. 2013 and claiming the priority of German patent application 102012111239.8 itself filed 21 Nov. 2012.

FIELD OF THE INVENTION

The invention relates to a method for the metered dispensing of a lubricant by a lubricant dispenser that has a cartridge filled with lubricant, at least one electrochemical gas-generating cell, and an electronic controller operating the gas-generating cell. The electronic controller has a microcontroller and a switch that can interrupt current flow through the gas-generating cell. Closing the circuit through the gas-generating cell releases gas from this cell to displace lubricant from the cartridge.

BACKGROUND OF THE INVENTION

Precise metering of lubricant dispensing is required in order to ensure both economical and sufficient lubrication. If lubricant is dispensed at excessively short intervals or in excessively large quantities, too much lubricant is used and the lubricant cartridge must be replaced earlier than necessary. Conversely, deficient lubrication occurring due to dispensing lubricant in too small amounts or too infrequently often results in damage to the machine components to be lubricated.

In order to determine the quantity of delivered lubricant, the current art estimates the quantity of gas generated by the gas-generating cell. This approach exploits the fact that under typical conditions the quantity of gas delivered by an electrochemical gas-generating cell is roughly proportional to the amount of current flowing through the gas-generating cell. Since the voltage that is produced by the chemical potential in a gas-generating cell, or the supply voltage from a DC voltage source that is possibly used to supplement this, and also the electrical properties of the gas-generating cell, such as, for example, the internal resistance are all known, the amount of current can be estimated that has flowed during the time the circuit is closed. The dispensing duration is defined based on this calculation and used as a fixed default value.

Practical experience has revealed, however, that the electrical properties of the circuit are variable. In particular, they change over the service life and performance life of the gas-generating cell and of any voltage source. They are furthermore highly temperature-dependent. The geometry of different cartridges with varying initial volumes of lubricant also affects the quantity of lubricant that is actually delivered. These effects mean that the above-described estimate of a delivered metered quantity of lubricant is increasingly imprecise, and the use of default values for the dispensing duration produces unsatisfactory results.

OBJECT OF THE INVENTION

In light of the above, the object of the invention is to provide for the metered dispensing of a lubricant a method that achieves improved dispensing precision using simple and cost-effective means.

SUMMARY OF THE INVENTION

The lubricant dispenser according to the invention has a lubricant cartridge filled with lubricant, at least one electrochemical gas-generating cell, and an electronic controller operating the gas-generating cell. The electronic controller comprises a microcontroller and a switch that can interrupt current flow through the gas-generating cell. The circuit is closed by the gas-generating cell at adjustable time intervals. Lubricant is displaced from the cartridge by the released gas. The displacement is preferably effected here by a piston, one side of which delimits the space containing the lubricant, and the other side of which is acted upon by the gas released in the gas-generating cell. As gas is generated, the electrical current flowing through the gas-generating cell is measured and the total current flowing through the gas-generating cell is added up by the microcontroller. The quantity of gas generated is proportional to the current that flows through the gas-generating circuit. The circuit is interrupted whenever the totaled current has exceeded a predetermined cumulative amount of current.

The direct use of the electrical current that has flowed enables the produced quantity of gas to be determined independently of the transition resistance levels in the circuit through the gas-generating cell. This significantly increases the dispensing precision and this precision is also maintained over the entire dispensing period. At the same time the effect of autodischarge of the gas-generating cells is also largely compensated for.

In a preferred embodiment, the method is implemented multiple times at successive time intervals. Here the amount of current by which the cumulative current has exceeded the desired current value is stored when the action is switched off. The summation of the cumulative current is then begun with this value during the next cycle. As a result, any systematic over-metering can be compensated for due to the fact that the circuit is interrupted not precisely when the predetermined amount of current has been reached but interrupted instead only once the predetermined amount of current has been exceeded. This enables the average metering precision to be considerably increased for an average cartridge content typically amounting to more than 100 metered dispensing cycles.

Measurement of the current is preferably effected discontinuously at equidistant time intervals. Multiplication of the measured current value by the time span between measurement points is used to calculate the amount of current that has flowed. This implementation can be effected especially easily and cost-effectively with a microcontroller. The time span between two measurement points is advantageously selected here so that the electrical properties of the gas-generating circuit, in particular the gas-generating cell, essentially do not change on this time scale. A typical value for this is in the range of one minute. At the same time the measurement interval should not be too great relative to the length of the average expected gas-generating phase of a metering interval. If the measurement interval is at maximum half as long as the length of an average gas-generating phase, over-productions of gas within a dispensing period can be reliably compensated for by the above-described carryover of the excessive current that has flowed.

In a preferred embodiment, the ambient temperature is measured at the start of a dispensing interval and the predetermined cumulative current is determined as a function of this temperature. This enables variations caused by the temperature dependencies and that are related to the chemical response characteristics of the gas-generating cell and also of the viscosity of the lubricant to be compensated for.

For purposes of simplifying the microcontroller and its software, the predetermined cumulative amount of current can be determined from a table that is stored in a memory of the controller.

This table is preferably of multidimensional design and contains values that are a function at least of the ambient temperature, the initial lubricant supply content of the unused cartridge, and the intended operating duration to completely empty the lubricant dispenser. In addition to the temperature-dependent effects, this table enables variations to be measured and compensated that are caused by the response characteristics and repeat response characteristics of the gas-generating cells and the geometry of different cartridge types.

In a preferred embodiment, the operating duration for completely emptying the cartridges is defined by user input. Another table stored in the memory of the controller contains the time interval between two successive dispensing cycles (dispensing interval) for each adjustable operating duration and can be retrieved therefrom. The length of the dispensing interval remains constant for the entire operation. Metering is performed by controlling the time span with gas generation (dispensing time). This is followed by a period with no gas generation (idle time) for the rest of the dispensing interval.

When cartridges of varying initial lubricant volumes are used, the same fraction of the initial lubricant supply content is advantageously delivered each time per dispensing cycle, with the result that the length of the dispensing interval for complete emptying is equal for an operating duration every time regardless of the cartridge type. Typically between a thousandth and a hundredth of the initial lubricant supply content is delivered each time per dispensing cycle.

BRIEF DESCRIPTION OF THE DRAWING

The following describes the invention in more detail with reference to drawings that show embodiments. Therein:

FIG. 1 is a longitudinal schematic section through a lubricant dispenser, and FIG. 2 is a detail view of an electrical circuit diagram for operating the lubricant dispenser shown in FIG. 1.

SPECIFIC DESCRIPTION OF THE INVENTION

The basic construction of the lubricant dispenser shown in FIG. 1 has a controller 1 and a lubricant cartridge 2. The interior of the lubricant cartridge 2 is filled with lubricant 3. The lubricant cartridge furthermore comprises at least one electrochemical gas-generating cell 4. The electronic controller 1 controls the flow of current through the gas-generating cell 4 and thereby controls the quantity of gas produced therein. This quantity of gas moves through a conduit into a compartment 5 behind a piston 6 in the lubricant cartridge, one side of which opposite to the compartment 5 delimits the compartment holding the lubricant 3. Positive pressure created in the compartment 5 by the production of gas is effective via the piston 6 on the lubricant. As a result, the lubricant 3 is displaced from the cartridge 2 and is expelled through an outlet opening 7.

FIG. 2 provides a highly simplified diagram of a possible embodiment of the circuitry of the electronic controller 1 that is used to carry out the method according to the invention. The electronic controller 1 has a microcontroller 8 and a switch 9 that can interrupt the current flow through the gas-generating cell 4. The switch 9 is controlled by the microcontroller 8 and is preferably a field-effect transistor, in particular, a metal-oxide semiconductor field-effect transistor (MOSFET). Use of a voltage-controlled field-effect transistor provides more economical control of the current flow than is the case with current-controlled bipolar transistors. The production of gas starts automatically in this example after the two terminal contacts of the gas-generating cell 4 are energized by the switch 9. The flow of current through the gas-generating cell 4 in alternative embodiments can also be generated or amplified by a supplemental DC voltage source. A sensor 10 measures the flow of electric current in the circuit, the measurement values for this current being acquired by the microcontroller 8. One possible embodiment for measuring the current can consist in measuring the voltage drop across a known internal resistance of the circuit.

The microcontroller 8 uses the switch 9 to close the circuit through the gas-generating cell 4 at adjustable time intervals. Lubricant is expelled from the cartridge by the released gas. As the gas is generated the electrical current flowing through the gas-generating cell 4 is measured by the sensor 10, and the total amount of current flowing through the gas-generating cell 4 is added up by the microcontroller 8. The microcontroller 8 uses the switch 9 to interrupt the circuit once a predetermined cumulative amount of current has been exceeded. The microcontroller 8 takes the predetermined cumulative amount of current from a table stored in its memory as a function of the ambient temperature measured by a temperature sensor 11.

The invention claimed is:

1. A method for the metered dispensing of a lubricant by a lubricant dispenser that has
   a lubricant cartridge filled with lubricant,
   at least one electrochemical gas-generating cell, and
   an electronic controller operating the gas-generating cell and comprising a microcontroller and a switch that can interrupt current flow through the gas-generating cell, the method comprising the steps of:
   a) closing a circuit through the gas-generating cell by the electronic controller at adjustable time intervals so as to displace lubricant from the cartridge by a released gas,
   b) measuring electrical current flowing through the gas-generating cell while the circuit is closed and as the gas is generated and summing over time the total current that has flowed through the gas-generating cell since the circuit has closed, and
   c) interrupting the circuit whenever the total current that has flowed through the circuit since closing of the circuit has exceeded a predetermined cumulative amount of current.

2. The method according to claim 1, wherein steps
   b) and c) are repeated each time the circuit is closed, the method comprising the steps of:
   storing how much the total current exceeds the predetermined current value when the circuit is interrupted; and
   beginning the summation of the current with this stored value during the next cycle.

3. The method according to claim 1, wherein the measurement of the current is effected discontinuously at measurement points separated by equal time intervals, and the summing of the amount of current that has flowed is effected by multiplying the measured current value by the time span between two measurement points.

4. The method according to claim 1, further comprising the steps of:

measuring the ambient temperature at the start of a dispensing interval and determining the predetermined cumulative amount of current as a function of this measured ambient temperature.

5. The method according to claim 1, further comprising the step of:

determining the predetermined cumulative amount of current from a table that is stored in a memory of the controller.

6. The method according to claim 5, wherein the table is of multidimensional design and contains values that are at least a function of the ambient temperature, the initial lubricant content of the unused cartridge, and the intended operating duration to completely empty the lubricant dispenser.

7. The method according to claim 1, further comprising the step of:

defining the operating duration to completely empty the cartridge by user input, and the time interval between successive dispensing cycles from a table for a set operating duration.

8. The method according to claim 7, further comprising the step, when cartridges of varying initial lubricant content are used, of:

delivering the same fraction of the initial lubricant content per dispensing cycle each time such that the length of the dispensing interval for an operating duration to effect complete emptying is equal.

9. A method for the metered dispensing of a lubricant by a lubricant dispenser having:

a lubricant cartridge filled with lubricant, at least one electrochemical gas-generating cell, and an electronic controller operating the gas-generating cell and comprising a microcontroller and a switch that can interrupt current flow through the gas-generating cell, the method comprising the steps of:

closing a circuit through the gas-generating cell by the electronic controller at adjustable time intervals so as to displace lubricant from the cartridge by a released gas, measuring electrical current flowing through the gas-generating cell at equal time intervals while the circuit is closed and as the gas is generated and determining a total current that has flowed through the gas-generating cell since the circuit was closed by multiplying the current at each measurement by the time span between succeeding measurements; and interrupting the circuit whenever the total current that has flowed through the circuit since closing of the circuit has exceeded a predetermined amount of current.

* * * * *